United States Patent [19]

Jensen et al.

[11] Patent Number: 5,158,436
[45] Date of Patent: Oct. 27, 1992

[54] PUMP WITH SPEED CONTROLLER RESPONSIVE TO TEMPERATURE

[75] Inventors: Niels D. Jensen; Ivan Knudsen, both of Bjerringbro; Bjarne D. Pedersen, Hammel, all of Denmark

[73] Assignee: Grundfos International a/s, Bjerringbro, Denmark

[21] Appl. No.: 668,033

[22] Filed: Mar. 12, 1991

[30] Foreign Application Priority Data

Mar. 29, 1990 [DE] Fed. Rep. of Germany ....... 4010049

[51] Int. Cl.$^5$ .............................................. F04D 15/00
[52] U.S. Cl. ........................................ 417/32; 417/45
[58] Field of Search ..................... 417/45, 32

[56] References Cited

U.S. PATENT DOCUMENTS

| 2,518,597 | 8/1950 | Brooks ................................ 417/32 |
| 3,232,519 | 2/1966 | Long .................................... 417/32 |
| 5,066,197 | 11/1991 | Champagne ........................ 417/45 |

FOREIGN PATENT DOCUMENTS

| 3706034 | 9/1987 | Fed. Rep. of Germany . |
| 3642727 | 6/1988 | Fed. Rep. of Germany . |
| 3642729 | 6/1988 | Fed. Rep. of Germany . |
| 3807832 | 10/1988 | Fed. Rep. of Germany . |
| 3814948 | 11/1989 | Fed. Rep. of Germany . |
| 0037517 | 3/1980 | Japan ..................................... 417/45 |

OTHER PUBLICATIONS

Chem.-Ing.-Tech. 60(1988)Nr. 1,S 43-46.

*Primary Examiner*—Richard A. Bertsch
*Assistant Examiner*—David W. Schevermann
*Attorney, Agent, or Firm*—Dvorak and Traub

[57] ABSTRACT

The pump unit is provided, in particular for heating and cooling installations. The speed of the pump unit may be altered by changing the operating frequency of a frequency converter feeding the electric motor and which forms a structural unit with the pump unit. As soon as the pump unit has reached a parameter characterizing the thermal overload of the same, the frequency converter is controlled in a manner so as to reduce the speed, the reduced speed n' being greater or equal to half the normal speed n.

9 Claims, 2 Drawing Sheets

FIG. I

PUMP WITH SPEED CONTROLLER RESPONSIVE TO TEMPERATURE

BACKGROUND OF THE INVENTION a) Field of the Invention

The invention relates to a pump unit, in particular for heating and cooling installations, the speed of which can be altered by changing the operating frequency of a frequency converter feeding the electric motor, and having a device which protects the unit from thermal overload, the pump unit and frequency converter forming a structural unit.

b) Description of the Prior Art

Pump units of this type are used as circulating pumps, for example in heating installations. A pump unit of this type is disclosed, for example in German Offenlegungsschrift 36 42 729. A pump unit of this type is usually provided with a protective motor switch which switches the motor off in the case of thermal overload. A thermostat arranged in the region of the motor winding and which drives a relay arranged in the terminal box is usually provided for this purpose.

Switching off the pump unit when there is thermal overload usually results in complete breakdown of the plant, in particular when used in heating and cooling installations, unless as is conventional for example in the case of heating installation in hospitals, a second pump unit is provided which is switched on automatically if there is a problem with the first one. A device of this type is disclosed, for example in German Offenlegungsschrift 37 06 034. In devices of this type the protective motor switch does therefore not suffice as such, it is additionally necessary to install a second pump unit operating completely independently of the first, to ensure the operational safety of the plant even if a pump unit fails. The constructional and hence also financial burden for devices of this type is correspondingly high. However, even the incorporation of the protective motor switch conventionally provided in or on a pump unit of this type represents a not inconsiderable cost factor in relation to the total cost. Particularly in the case of pump units described in the introduction which are equipped with a frequency converter to adjust the speed, it is already difficult to arrange the relay of the protective motor switch on the pump unit for reasons of space, since the terminal box otherwise conventionally provided for this purpose is required as installation space for the frequency converter or parts of it.

Starting from the state of the art mentioned in the introduction the main object of the present invention is to design a generic pump unit in a simple and cost effective manner, so that on the one hand a protective motor switch of the type described above can be dispensed with for reasons relating to the constructional size and the constructional costs, and on the other hand a certain emergency facility is ensured even when the pump unit is thermally overloaded, so that failure of a plant supplied by the pump unit is avoided.

SUMMARY OF THE INVENTION

To this end, the present invention consists in a pump unit, in particular for heating and cooling installations, the speed of which can be altered by changing the operating frequency of a frequency converter feeding the electric motor, and having a device which protects the unit from thermal overload, the pump unit and frequency converter forming a structural unit, characterised in that when a parameter characterising the overload state is reached, the motor speed n is reduced to a motor speed n' by driving the frequency converter, the reduced speed n' being selected to be greater or equal to half the normal speed n.

The solution in accordance with the invention has the considerable advantage that the pump unit is not switched off, as has been hitherto conventional, when the latter is thermally overloaded; instead the power is only reduced and this takes place by lowering the motor speed by means of the frequency converter which is already present. As a result, on the one hand the incorporation of an expensive and space consuming protective motor switch may be dispensed with and on the other hand a second separate pump unit may often be dispensed with in heating installations, since the pump unit of the invention operates with power—even if it is reduced—when there is a danger of thermal overload.

The invention thus utilizes the model laws which apply to rotary pumps to an exceptional extent, and according to which the feed stream changes approximately proportionally to the pump speed, whereas the drive power of the pump increases with the speed to the power three. This has the result that the drive power drops to a considerable extent even when the reduction in speed is relatively low, and naturally heat evolution within the motor winding is also reduced because of this. If for example the speed is reduced to 80 per cent of the normal speed n, the drive power of the pump is reduced to 51 per cent of the normal drive power. However, the feed stream is also reduced to only 80 per cent of the original feed stream. When using the pump unit of the invention, for example in a heating installation, a reduction in speed of this type would scarcely have traceable effects on the heating system, since in this case only a reduction in power between about 2 and 5 per cent would make a difference due to the longer residence time of the water and the greater cooling down of the water in the heater. However, by reducing the drive power to about half, the motor winding could be cooled down again relatively quickly due to the motor heat evolution which is then clearly reduced. A further advantage in comparison to a motor switch switching off completely in the case of thermal overload, is that heat accumulation within the motor can be avoided as a result of continuing to run the pump unit at reduced power, so that the limiting temperature, at which it is necessary to reduce the speed to avoid thermally overloading the unit, may be higher than for known pump units.

Further advantageous embodiments of the invention are characterised by the features listed in the sub-claims.

A temperature is advantageously used as the parameter characterising the overload state, a limiting temperature then being determined and when it is reached the frequency converter is driven so as to reduce the speed.

A highest permissible temperature for the motor winding is advantageously determined as the limiting temperature, since thermal overload states occur predominantly in the region of the motor winding in a pump unit of the type mentioned.

Depending on the type of construction, it is however not necessary to measure the temperature of the motor winding directly, for example by using a temperature sensor. The motor winding temperature may also be determined very reliably in the vast number of cases by measuring electrical parameters, preferably by measuring the winding resistance. Determining the motor winding temperature indirectly in this manner has the advantage of being able to dispense with a sensor within the winding, and only one electronic component, which can be combined and/or arranged there optionally with the electronic mechanism of the frequency converter, is necessary.

The limiting temperature, at which the frequency converter is driven so as to reduce the speed may also be determined by means of a highest permissible storage temperature within the pump unit. In accordance with the invention several parameters characterising the overload state may also be predetermined, and when they are reached the motor speed is reduced. It is of course sufficient if one of these parameters is reached.

The temperature in the converter electronic mechanism may also be used to determine the overload state. A design of this type has the advantage that the electronic components required for it may be arranged in the frequency converter electronic mechanism and this is particularly favourable in terms of production engineering. The temperature is advantageously measured in the power part of the frequency converter, since the greatest waste heat can be removed in this component, and the waste heat produced there is approximately proportional to the waste heat produced in the motor winding.

Thermal overloading of the pump unit cannot be caused just as a result of excessive heat outputs within the unit itself, but also as a result of external conditions. The invention therefore also proposes parameters characterising the overload state and at which the motor speed is reduced, in addition to those specific to the unit mentioned above, to reduce the motor speed when an external parameter, such as for example the temperature of the conveyed fluid, exceeds a predetermined permissible value. A reduction in the speed is then necessary, since the waste heat produced within the unit can no longer be removed to an adequate extent.

The pump unit is advantageously designed so that after reducing the speed, as soon as a value is lower than the parameter characterising the overload state again, the speed is then raised again to the original normal speed n. There should be a certain distance between the two switching points for reasons relating to control engineering, to avoid constant reversing of the frequency converter.

BRIEF DESCRIPTION OF THE DRAWING

The foregoing summary of the invention, as well as the following detailed description of the preferred embodiment, will be better understood when read in conjunction with the appended drawing FIG. 1. For the purpose of illustrating the invention, there is shown in the drawing an embodiment which is presently preferred, it being understood, however, that the invention is not limited to the specific arrangement and instrumentalities disclosed.

The drawing

DESCRIPTION OF THE PREFERRED EMBODIMENT

Figure 1:
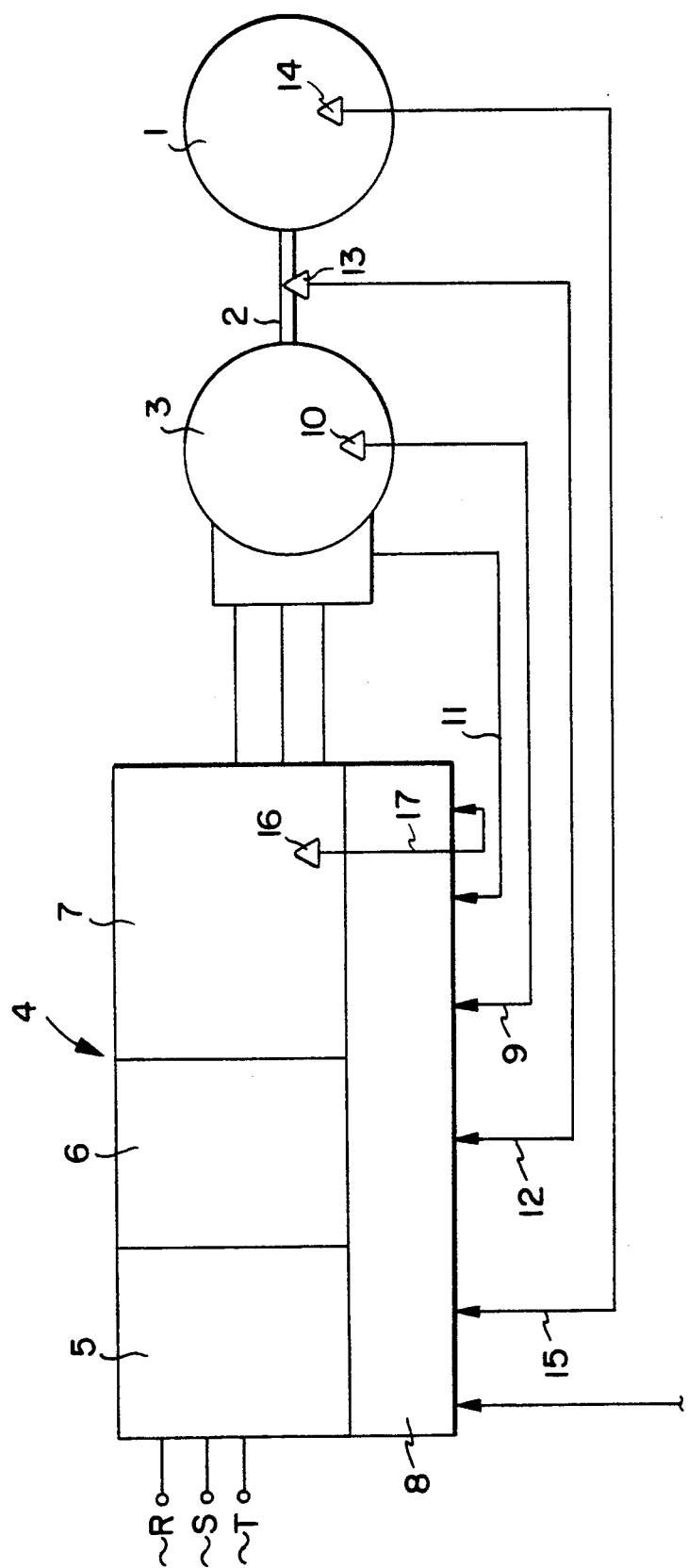
FIG. 1 shows a block circuit diagram of a pump unit according to the invention.
Figure 2:
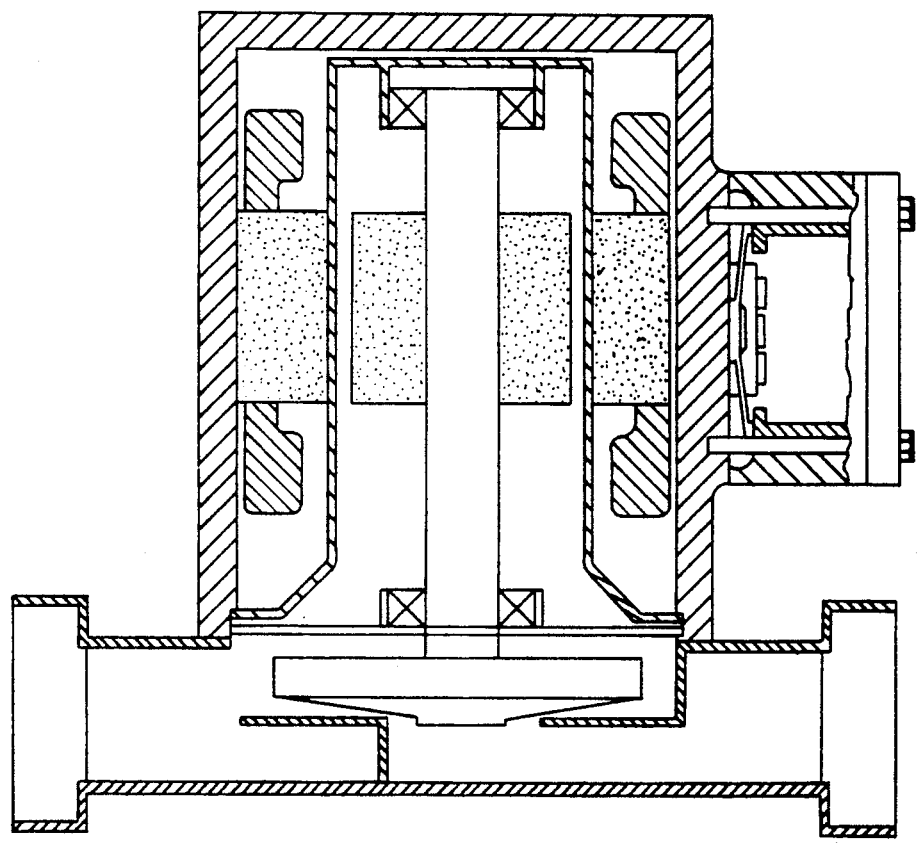
FIG. 2 illustrates a pump unit with the motor and frequency converter in heat-conducting connection with the casing, forming a structural unit, according to the invention.

The pump unit designed as a structural unit essentially comprises a pump 1 which is connected in driving relationship to an electric motor 3 by means of a shaft 2, and a frequency converter 4 connected upstream of the motor 3 and by means of which the motor speed can be controlled.

The frequency converter 4 has a rectifier 5 provided for connection to the electric distributing network, an intermediate circuit 6 connected downstream of the latter, and a power circuit 7 connected to that, in a manner known per se. The power circuit 7 is provided for connection to the motor 3. The rectifier 5 (also called input circuit), the intermediate circuit 6 and the power circuit 7 are linked by means of a control and feedback circuit 8 in a manner known per se.

The control and feedback circuit 8 has several drive inputs, five inputs of which are employed here for overload safety by means of motor speed reduction described above.

A temperature sensor 10 arranged in the winding of the motor 3 is connected via a signal line 9. The voltage signal waiting at the motor winding and by means of which the winding resistance is determined within the control and feedback circuit 8, is transmitted via the signal line designated 11. The winding resistance serves as a measure of the winding temperature, so that when a preset resistance value is reached, the speed is reduced by means of the control and feedback circuit 8 in the same manner as would take place when the winding temperature determined by means of the heat sensor 10 via the signal line 9 is reached.

A temperature sensor 13 is connected to the input of the control and feedback circuit 8 via a signal line 12. The temperature sensor 13 is arranged within a store of the pump unit. When a predetermined storage temperature, at which overload of the pump unit is to be expected—whether it is in the motor 3, in the pump 1 or in the store itself—is exceeded, it is reported at the control and feedback circuit and recorded by it via the sensor 13 and the signal line 12, whereupon the speed is reduced in the order of magnitude described above.

Furthermore, a temperature sensor 14 is connected to the input of the control and feedback circuit 8, which measures the temperature of the fluid conveyed within the pump 1 and passes it to the control and feedback circuit 8, via a single line 15, so that when a predetermined fluid temperature is exceeded there is a reduction in speed by means of the control and feedback circuit 8.

A temperature sensor 16, which is connected to the input of the control and feedback circuit 8 via a signal line 17, is arranged in the power circuit 7 of the frequency converter 4. The temperature within the power circuit 7 is also monitored here by means of the control and feedback circuit 8, so that the speed is reduced when a predetermined critical temperature is exceeded.

The devices described above to determined a parameter characterising the overload state in the pump unit—with the exception of the sensor 14 measuring the fluid temperature may be used alone and in combination for the protection against overload described above. The particular characteristics may be preset in the frequency converter 4 and can be changed, so that they can be adapted to the local conditions of use.

If one of the critical parameters described above is reached, the motor speed is reduced by a presettable value. The value of the reduced speed n' should not be smaller than half the normal speed n, since otherwise the feed stream of the pump unit would fall too wide. A preferred reduction in speed, in particular when using the pump unit in heating installations, is 80 per cent of the normal speed (n'=0.8 *n), since the motor power is almost halved in this region and virtually no reduction in power in the heating installation is to be expected.

The present invention may be embodied in other specific forms without departing from the spirit or essential attributes thereof and, accordingly, reference should be made to the appended claims, rather than to the foregoing specification as indicating the scope of the invention.

We claim:

1. Pump unit, in lar for heating and cooling installations, the speed of which can be altered by changing the operating frequency of a frequency converter feeding the electric motor, and having a device which protects the unit from thermal overload, the pump unit and frequency converter forming a structural unit, characterised in that when a parameter characterising the overload state is reached, the motor speed n is reduced to a motor speed n' by driving the frequency converter, wherein the relationship n'≧0.5 n applies.

2. Pump unit according to claim 1, wherein the parameter characterising the overload state is a limiting temperature.

3. Pump unit according to claim 2, wherein the limiting temperature is determined by means of a highest permissible temperature of a winding in the stator.

4. Pump unit according to claim 3, wherein the temperature of the winding is determined by measuring the electrical winding resistance.

5. Pump unit according to claim 2, wherein the limiting temperature is determined by means of a highest permissible storage temperature for the unit.

6. Pump unit according to claim 2, wherein the limiting temperature is determined by means of a highest permissible temperature in the converter electronic mechanism.

7. Pump unit according to claim 6, wherein the limiting temperature is determined by means of a highest permissible temperature in the power part of the frequency converter.

8. Pump unit according to claim 1, wherein the motor speed is also reduced when a predetermined temperature of the fluid conveyed through the pump is reached.

9. Pump unit according to claim 1, wherein the motor speed is raised again to the speed n when a value is lower than the parameter characterising the overload state, the parameter resulting in an increase in speed when it is reached differing from the parameter resulting in a decrease in speed when it is reached, or a dead time element is provided.

* * * * *